United States Patent
Pantzar et al.

[11] Patent Number: 5,976,455
[45] Date of Patent: *Nov. 2, 1999

[54] CUTTING INSERT WITH A THREADED CENTRAL APERTURE

[75] Inventors: Göran Pantzar, Årsunda; Björn Håkansson, Halmstad; Stefan Roman, Sandviken; Per-Anders Holmström, Ekerö, all of Sweden

[73] Assignee: Sandvik AB, Sandviken, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/750,256

[22] PCT Filed: May 26, 1995

[86] PCT No.: PCT/SE95/00603

§ 371 Date: Feb. 19, 1997

§ 102(e) Date: Feb. 19, 1997

[87] PCT Pub. No.: WO95/33590

PCT Pub. Date: Dec. 14, 1995

[30] Foreign Application Priority Data

Jun. 7, 1994 [SE] Sweden .................................. 9401993

[51] Int. Cl.⁶ .................................................. B23B 27/16
[52] U.S. Cl. ................................ 419/14; 419/36; 419/54; 407/119; 407/103
[58] Field of Search ..................................... 407/119, 113, 407/32, 48, 103, 118; 419/36, 54, 14

[56] References Cited

U.S. PATENT DOCUMENTS

| | | |
|---|---|---|
| 2,780,856 | 2/1957 | Traycoff . |
| 3,925,868 | 12/1975 | Singh ...................................... 407/103 |
| 4,230,428 | 10/1980 | Haug ......................................... 407/48 |
| 4,231,406 | 11/1980 | Jonsson .................................... 407/48 |
| 4,378,184 | 3/1983 | Briese . |
| 4,645,386 | 2/1987 | Smtih ...................................... 407/113 |
| 4,852,622 | 8/1989 | Eriksson ................................. 407/103 |
| 5,314,269 | 5/1994 | Arai ......................................... 407/42 |
| 5,346,517 | 9/1994 | Collin . |
| 5,697,046 | 12/1997 | Conley .................................... 428/547 |
| 5,752,155 | 5/1998 | Gates, Jr. et al. ........................ 419/14 |
| 5,776,593 | 7/1998 | Massa et al. ............................ 428/212 |

FOREIGN PATENT DOCUMENTS

| | | | |
|---|---|---|---|
| 552382 | 4/1943 | United Kingdom ................... 407/103 |
| 933770 | 4/1963 | United Kingdom ................... 407/103 |

*Primary Examiner*—Daniel W. Howell
*Assistant Examiner*—Mark Williams
*Attorney, Agent, or Firm*—Burns, Doane, Swecker & Mathis, L.L.P.

[57] ABSTRACT

A metal cutting insert includes a cemented carbide body having a cutting edge and a hole therein for receiving a fastening screw. The hole includes female screw threads for being screw threaded to the fastening screw. The insert is made by a process involving injection molding and sintering steps.

3 Claims, 2 Drawing Sheets

CUTTING INSERT WITH A THREADED CENTRAL APERTURE

BACKGROUND OF THE INVENTION

The present invention relates to a cutting insert with an entirely or partly threaded central hole for receiving a locking screw.

The vast majority of the plurality of different cutting inserts existing today on the market have a central through hole. This hole is intended to accommodate a suitable locking screw for fastening the insert in a holder. If the cutting insert is intended for turning, the holder usually consists of a turning bar; if the cutting insert is intended for milling, the holder is, e.g., a milling cutter body, a long edge milling cutter or an end mill. The cutting insert may also be intended for boring and then it may be fastened by a screw in a boring shaft. Most commonly the cutting insert is an indexable cutting insert, which means that when a cutting edge has been worn out, the locking screw may be loosened and the insert turned by a half or quarter of a revolution, whereby a new cutting edge is placed or indexed into an operative position. Cutting inserts including indexable, cutting inserts exist with innumerous different geometries, in order to give a good chip breaking and chip control and a low energy consumption. The inserts are mostly made of coated or uncoated cemented carbide, but cutting inserts of different ceramic materials also exist. They usually have a square, triangular, rhombic, rectangular or hexagonal basic shape, but other basic shapes also occur. However, they usually have one thing in common, namely that they are all provided with a central through hole in the geometrical central point. These holes can have different hole designs, but they all have in common that the hole wall is substantially smooth. As mentioned, a threaded screw is inserted into this smooth hole and is threaded into a threaded hole in the holder per se, upon which the insert rests, and is fastened onto this holder. This basic configuration usually functions satisfactorily, but is nevertheless marred by some drawbacks, which it would be desirable to eliminate. For instance, the screw head must be countersunk into the insert's hole in order not to obstruct the chip flow, which brings about a further weakening of the cutting insert, which is already relatively fragile. Further, specifically because of this weakening of the insert's strength, the central hole cannot be made with too a large diameter, which means that the screw's diameter is relatively weak. Therefore, it sometimes occurs that the screw is broken when tightened without care and/or too strongly. Seen from another aspect, the small maximum allowed screw diameter restricts the possible magnitude of the tightening strength.

Another disadvantage is that the requirement of accessability to the screw head sometimes constitutes a complicating and restricting factor for certain application e.g., for extremely close pitch cutters. Another case when good accessability is desirable is when a very large number of cutting inserts are to be screw-fastened by a power-driven screw tightener with a preset maximal torque. For instance, in some bar peeling operations the number of cutting inserts is very high and the accessability for such a screw tightener is poor.

Thus, one object of the present invention is to provide a cutting insert with a larger hole diameter in order to make possible larger tightening forces.

Another object of the present invention is to improve the accessability when tightening the locking screw.

SUMMARY OF THE INVENTION

These and other objects have been achieved in a surprisingly simple way by providing a cutting insert with a wholly or partly threaded central hole in accordance with the characterizing part of claim 1.

For illustrative but non-limiting purposes, the invention will now be further described with reference to the appended drawings. These are herewith presented:

DETAILED DESCRIPTION OF PREFERRED EMBODIMENTS OF THE INVENTION

Figure 1:
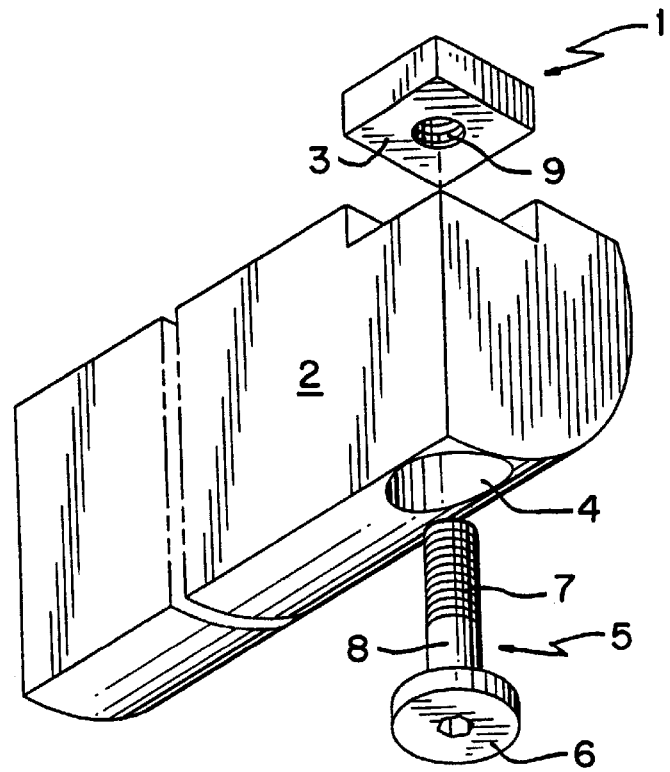
FIG. 1 shows in an exploded bottom perspective view the fastening of a cutting insert according to the present invention.

In FIG. 1 a cutting insert, such as an indexable cutting insert, is generally designated by 1, and a holder by 2. The cutting insert is made of one single piece. The geometry of the cutting insert 1 is not essential for the present invention, as long as the bottom support surface 3 partly or in its entirety is sufficiently planar to withstand the stress and guarantee a stable cutting position.

The construction of holder 2 also is not an essential feature for the present invention, wherefore its depiction in the figures should be understood as purely principal. According to the embodiment as shown in FIG. 1, the holder is provided with a through-hole 4, which is intended to accomodate a locking screw 5. The head 6 of the locking screw is suitably countersunk into the hole 4, the hole being shaped with a larger diameter in its lower part. Suitably, the hole is smooth in its entirety. However, the hole 4 may also be provided with a threaded part corresponding to the screw's thread 7, which is threaded past the thread of the hole and thereafter cannot fall out of the hole 4 any longer. In this case, the screw's unthreaded part 8 has to be of a somewhat smaller diameter than the diameter of the thread 7, in order to rotate freely in the thread of the hole.

The essential feature of the present invention is that the central hole 9 of the cutting insert is threaded, in order to be fastened by the thread 7 of the locking screw, the thread of the insert being formed directly in the hard material of which the insert consists. Since the production of such a thread is not possible by conventional form pressing, the insert is produced by an injection moulding technique, which is previously known as such. This technique is a common production technique in the plastic industry for the manufacturing of different details. A paste consisting of or containing thermoplastic or thermosetting polymers is heated to a suitable temperature and is then pressed through a die into a mould of desired geometry. In powder metallurgy injection moulding is used for the production of relatively complex details of metallic powder, such as powder of cemented carbide. The cemented carbide powder is then mixed with polymers. After moulding, the polymer is driven off, whereafter the detail is sintered in substantially the same way as corresponding tool-pressed details. The thread is obtained by providing the mould with a threaded tap i.e., a thread-forming element, in the middle, this tap being threaded out after the moulding, or being burnt away after the sintering.

The type of threads as such is not essential for the present invention. Thus, the central hole may be made with different nut (female) threads which are well-known per se, such as for instance a V-thread with a triangular basic profile (e.g., normal metric thread or so called M-thread), different pipe threads, trapezoid and square threads, and also so called round threads. Further, the hole may be tapered, although a cylindrical shape is most common. The advantage with a conical thread is that the threads may be engaged and disengaged, respectively, by a short turning, suitably less than two revolutions.

Preferably, the central hole 9 is a through-hole, but it may also be a blind hole. In the latter case, the length of the screw must of course be adapted thereto, in order to permit a sufficient play between the screw's end and the bottom of the hole.

Figure 2:
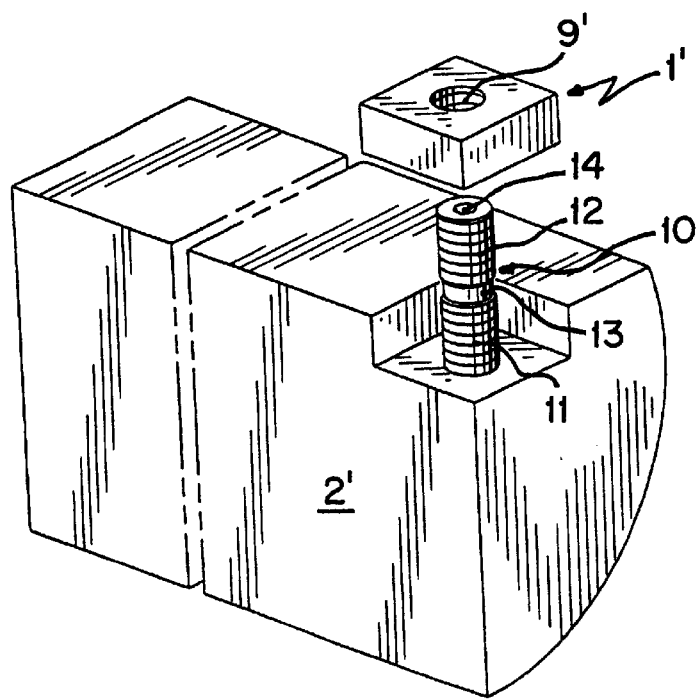
FIG. 2 shows another embodiment of the fastening of a cutting insert according to the present invention, in a perspective view obliquely from above.

If the accessability from above the cutting position is good, a construction according to FIG. 2 may be chosen. In accordance with this construction, the cutting insert 1' is fastened by a double-threaded differential screw 10. This screw has two threaded portions 11 and 12, respectively, and an unthreaded waist portion 13 between these two portions. In a way known per se, these thread portions 11 and 12 are threaded in opposite directions. For instance, if the portion 11 has a left-hand thread then, also the hole in the holder 2' is left-hand threaded with, the thread portion 12 and the insert hole 9' being right-hand threaded. The differential screw is rotated by inserting a suitable tightening device into the hole 14, which suitably is hexagonal or of the so called torx type. Also in this case, the hole in the holder may be a through-hole, also the other end of the differential screw being provided with a suitable recess, for optional tightening either from above or from underneath.

Figure 3:
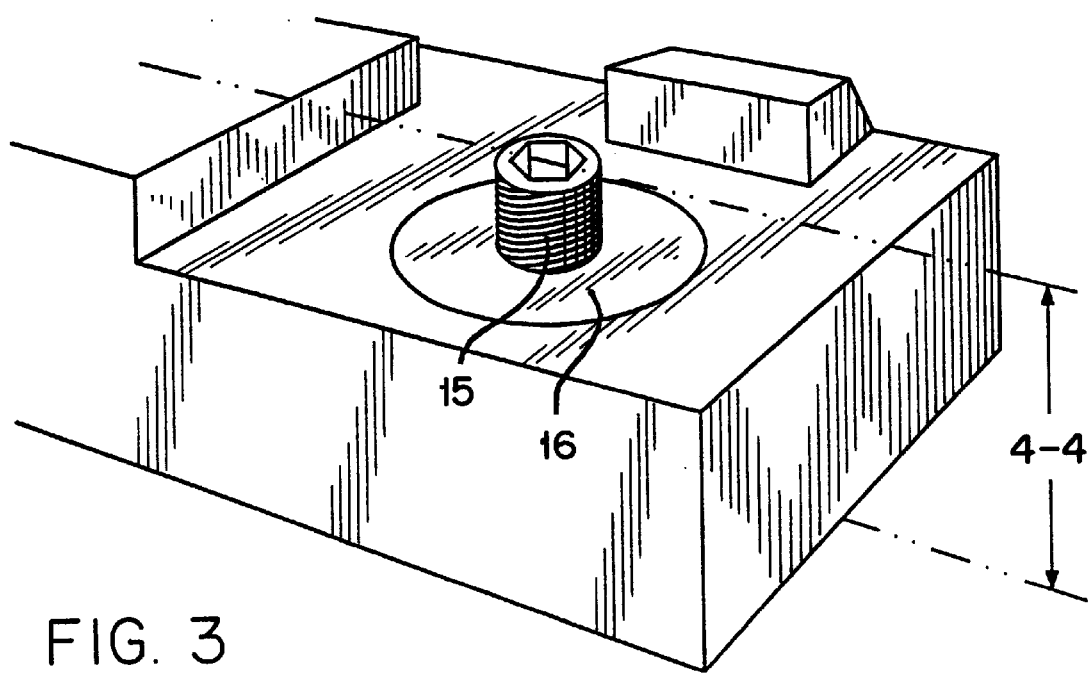
FIG. 3 shows another embodiment for fastening the cutting insert according to the present invention.
Figure 4:
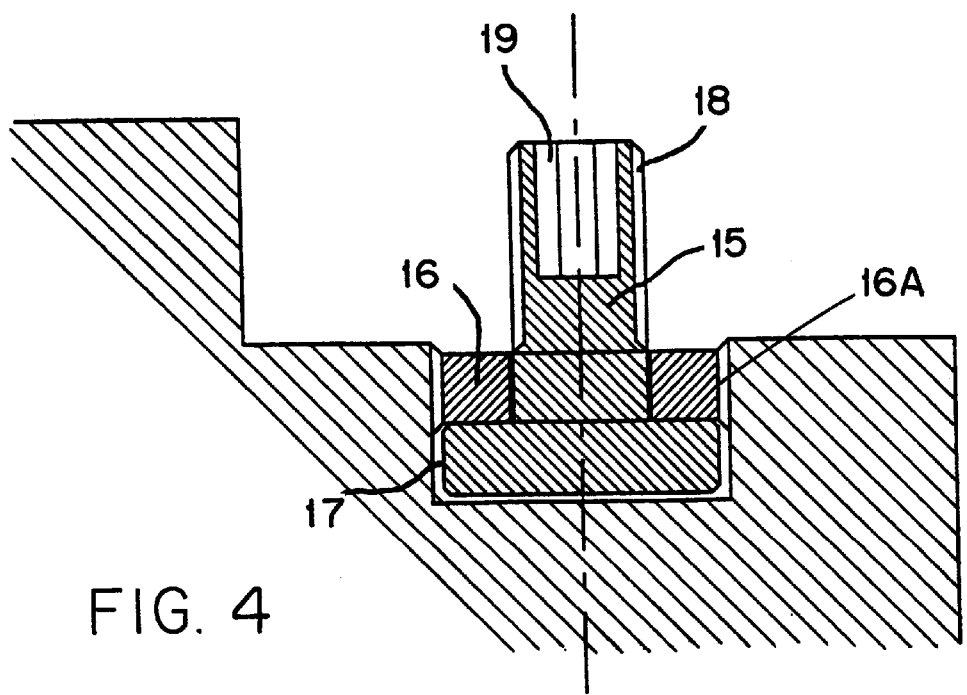
FIG. 4 shows a cross-section taken along line 4—4 in FIG. 3.

Still another embodiment for the fastening of a cutting insert according to the invention is shown in FIGS. 3 and 4. According to these figures, a locking screw 15 is locked in a rotatable state by a securing washer 16 with a threaded envelope surface 162. The holder is provided with a blind hole 17, which at least in its upper part is threaded for the thread-fastening of securing washer 16. However, before the securing washer is threaded into the hole 17, the screw 15 is inserted through the central hole of the securing washer, whereby the screw is withheld in a rotatable state after the securing washer has been fastened. The locking screw is provided with a thread 18 which should be in the opposite direction relative to the threading of the securing washer. The end of the screw is formed with a rotation-symmetrical recess 19 for tightening the cutting insert (not shown), the recess 19 in a usual manner suitably being hexagonal or of the so called torx type. If desirable, a hole of a smaller diameter than the diameter of the blind hole 17 may open into Lhe bottom of the latter hole and coaxially with it, the head of locking screw 15 being provided with a rotation-unsymmetrical hole in substantially the same way as hole 19. In this way, the screw may be rotated either from below or from above.

As may be conceived from the above description, still another advantage of the present invention is based on the fact that the locking screw can be withheld in the holder when replacing a cutting insert, and when indexing a new cutting edge for indexable cutting inserts. In this way, the sometimes trying and time-consuming handling of small loose locking screws is avoided, which may easily be dropped and/or be difficult to set.

We claim:

1. A method of making a cutting insert, comprising the steps of:
    A. positioning a thread-forming element in a mold, the element having a screw thread for forming a female screw thread;
    B. injection molding in the mold a body from a mixture of cemented carbide powder and a polymer, the body having a cutting edge and a hole therein, at least a portion of a length of the hole having the female screw thread formed by the thread-forming element;
    C. driving off the polymer; and
    D. sintering the remaining carbide powder.

2. The method according to claim 1 further including, subsequent to step D, the step of burning away the thread-forming element.

3. The method according to claim 1 further including, subsequent to step B, the step of unscrewing the thread-forming element out of the body.

* * * * *